(12) United States Patent
Masuda et al.

(10) Patent No.: US 7,868,089 B2
(45) Date of Patent: Jan. 11, 2011

(54) THERMOPLASTIC POLYMER COMPOSITION

(75) Inventors: Haruhisa Masuda, Settsu (JP); Tsuyoshi Ono, Settsu (JP)

(73) Assignee: Daikin Industries Ltd., Osaka (JP)

( * ) Notice: Subject to any disclaimer, the term of this patent is extended or adjusted under 35 U.S.C. 154(b) by 1117 days.

(21) Appl. No.: 10/593,817

(22) PCT Filed: May 16, 2005

(86) PCT No.: PCT/JP2005/008910

§ 371 (c)(1),
(2), (4) Date: Sep. 22, 2006

(87) PCT Pub. No.: WO2005/111140

PCT Pub. Date: Nov. 24, 2005

(65) Prior Publication Data

US 2007/0225430 A1    Sep. 27, 2007

(30) Foreign Application Priority Data

May 17, 2004  (JP)  ............... 2004-146196
Aug. 30, 2004  (JP)  ............... 2004-250242

(51) Int. Cl.
*C08F 214/26*    (2006.01)
(52) U.S. Cl. ............ 525/104; 525/199; 525/200
(58) Field of Classification Search ............... 525/104, 525/199, 200
See application file for complete search history.

(56) References Cited

U.S. PATENT DOCUMENTS

| 3,864,433 A | | 2/1975 | Tatsukami et al. | |
|---|---|---|---|---|
| 4,028,431 A | * | 6/1977 | Futami et al. | 525/104 |
| 4,260,698 A | * | 4/1981 | Tatemoto et al. | 525/102 |
| 5,554,689 A | * | 9/1996 | Langstein et al. | 525/102 |
| 7,173,092 B2 | * | 2/2007 | Gornowicz et al. | 525/104 |
| 7,348,366 B2 | * | 3/2008 | Walker et al. | 522/148 |
| 7,479,532 B2 | * | 1/2009 | Tonge | 528/24 |
| 2004/0147676 A1 | | 7/2004 | Irie et al. | |
| 2006/0041064 A1 | * | 2/2006 | Gornowicz et al. | 525/104 |
| 2006/0142492 A1 | * | 6/2006 | Park | 525/199 |

FOREIGN PATENT DOCUMENTS

| JP | 49-133442 A | 12/1974 |
|---|---|---|
| JP | 54-50550 | 4/1979 |
| JP | 54-50550 A | 4/1979 |
| JP | 5-117478 A | 5/1993 |
| JP | 5-287125 A | 11/1993 |
| JP | 9-296072 A | 11/1997 |
| WO | 00/59999 A1 | 10/2000 |
| WO | WO 01/23470 A1 | 4/2001 |

* cited by examiner

*Primary Examiner*—Bernard Lipman
(74) *Attorney, Agent, or Firm*—Sughrue Mion, PLLC

(57) ABSTRACT

The invention provides a thermoplastic polymer composition which has both excellent heat resistance and chemical resistance, and also has flexibility and excellent processability. The present invention is a thermoplastic polymer composition comprising a fluororesin (A) and non-fluorine-containing cured rubber (B), wherein the fluororesin (A) comprises a fluorine-containing ethylenic polymer (a), and the non-fluorine-containing cured rubber (B) is at least one kind of rubber (b) which is at least partially crosslinked.

17 Claims, No Drawings

THERMOPLASTIC POLYMER COMPOSITION

TECHNICAL FIELD

The present invention relates to a thermoplastic polymer composition comprising a specific fluororesin and a specific cured rubber, and a molded article, a sheet, a film, a laminate or an electric wire jacket, which comprise the thermoplastic polymer composition.

BACKGROUND ART

Since cured rubbers have excellent heat resistance, chemical resistance and flexibility, they are widely used in automobile parts, consumer electric appliance parts, electric wire covering, parts for medical use. However, in order to produce molded articles using cured rubbers, for example, it is general to be processed through several complicated steps: such as (1) a step of mixing an uncured rubber with a crosslinking agent, an acid accepter, a filler, (2) a step of molding by using an extruder or an injection molding machine, and (3) a step of crosslinking by using a press or an oven, so it takes a long time to obtain a molded article. In addition, there have problems such that rubbers do not melt after being crosslinked, and thus the rubbers can not be subject to post-process such as melt-adhesion.

In order to solve the above-described problems, so called dynamic vulcanization technique has been developed such that crosslinking is conducted while a thermoplastic resin such as polypropylene resin, an uncrosslinked crosslinkable rubber and a crosslinking agent are all together melt-kneading in an extruder.

As a dynamically-vulcanized rubber (TPV), for example, one having a structure in which a crosslinked ethylene-propylene-diene rubber (EPDM) is dispersed in a propylene resin (see, e.g., JP-A-6-287368, JP-A-6-256571 and JP-A-11-228750) is widely studied and practically used in a part.

However, since a matrix is a polypropylene resin, it is a fact that the TPV comprising the above polypropylene resin and a crosslinked EPDM does not have heat resistance at a melting point of a polypropylene resin or more, and chemical resistance is also inferior.

For the purpose of developing TPV excellent in heat resistance and chemical resistance, it is known TPV having a structure that a polyester resin or 4-methyl-1-pentene resin is used as a matrix and a cured rubber is dispersed therein (see, e.g., JP-A-10-212392 and JP-A-11-269330). However, compared with TPV comprising a polypropylene resin and crosslinked EPDM, heat resistance and chemical resistance are somewhat improved in these TPV, but they are not sufficient, and the TPV also has a problem that flexibility and mechanical performance are inferior.

Further, there is studied TPV having a structure that a fluororesin is used as a matrix and a crosslinked fluororubber is dispersed therein as a cured rubber (see, e.g., JP-A-61-57641, JP-A-5-140401 and JP-A-6-228397). Although such TPV has excellent heat resistance and chemical resistance due to a matrix of fluororesins, they have poor low-temperature property, poor flexibility and compression permanent deformation resistance, and not enough mold-processability.

DISCLOSURE OF INVENTION

An object of the present invention is to provide a thermoplastic polymer composition which has both excellent heat resistance and chemical resistance, and also has flexibility and excellent processability.

Namely, the present invention relates to a thermoplastic polymer composition, comprising a fluororesin (A) and non-fluorine-containing cured rubber (B), wherein the fluororesin (A) comprises a fluorine-containing ethylenic polymer (a), and the non-fluorine-containing cured rubber (B) is at least one rubber (b) which is at least partially crosslinked.

It is preferable that the fluorine-containing ethylenic polymer (a) has a melting point of 120 to 310° C.

It is preferable that the rubber (b) is at least one rubber selected from the group consisting of an olefin rubber, an acrylic rubber, a nitrile rubber, a silicone rubber, an urethane rubber and an epichlorohydrin rubber.

It is preferable that the cured rubber (B) is a rubber in which the rubber (b) is dynamically vulcanized in the presence of the fluororesin (A) and a crosslinking agent (C).

It is preferable that the fluororesin (A) forms a continuous phase and the cured rubber (B) forms a dispersion phase in the structure of the composition.

It is preferable that the fluororesin (A) is a copolymer of tetrafluoroethylene and ethylene.

It is preferable that the fluororesin (A) is a copolymer of tetrafluoroethylene and a perfluoro ethylenically unsaturated compound represented by the following general formula (1):

$$CF_2=CF-R_f^1 \qquad (1)$$

(wherein $R_f^1$ represents $-CF_3$ and/or $-OR_f^2$, and $R_f^2$ represents a perfluoroalkyl group having 1 to 5 carbon atoms).

It is preferable that the copolymer of tetrafluoroethylene and a perfluoro ethylenically unsaturated compound has a melting point of 120 to 245° C.

It is preferable that the fluororesin (A) is a polymer comprising 19 to 90% by mole of a tetrafluoroethylene unit, 9 to 80% by mole of an ethylene unit, and 1 to 72% by mole of a perfluoro ethylenically unsaturated compound unit represented by the following general formula (1):

$$CF_2=CF-R_f^1 \qquad (1)$$

(wherein $R_f^1$ represents $-CF_3$ and/or $-OR_f^2$, and $R_f^2$ represents a perfluoroalkyl group having 1 to 5 carbon atoms).

It is preferable that the fluororesin (A) is polyvinylidene fluoride.

It is preferable that the rubber (b) is at least one selected from the group consisting of an ethylene-propylene-diene rubber, an ethylene-propylene rubber, a butyl rubber, a halogenated butyl rubber, an acrylonitrile-butadiene rubber, a hydrogenated acrylonitrile-butadiene rubber, a dimethylsilicone rubber, a vinylmethylsilicone rubber and a styrene-diene-styrene block copolymer.

It is preferable that the crosslinking agent (C) is at least one selected from the group consisting of organic peroxide, an amine compound, a hydroxy compound, a phenol resin compound, a sulfur compound, a bismaleimide compound and a quinoid compound.

It is preferable that the rubber (b) has at least one crosslinkable functional group in a molecule, and the crosslinking agent (C) is an at least bifunctional compound which can react with said functional group.

It is preferable that the thermoplastic polymer composition further comprises a flame retardant.

The present invention relates to a molded article, a sheet, a film, an electric wire jacket comprising the thermoplastic polymer composition, or a LAN cable equipped with the electric wire jacket.

The present invention relates to a laminate, which has layers comprising the thermoplastic polymer composition.

BEST MODE FOR CARRYING OUT THE INVENTION

The present invention relates to a thermoplastic polymer composition comprising a fluororesin (A) and non-fluorine-containing cured rubber (B), wherein the fluororesin (A) comprises a fluorine-containing ethylenic polymer (a), and the non-fluorine-containing cured rubber (B) is at least one kind of rubber (b) which is at least partially crosslinked.

A melting point of the fluororesin (A) is 120 to 310° C., more preferably 150 to 290° C., and further more preferably 170 to 250° C. When the melting point of fluororesin (A) is less than 120° C., heat resistance of the obtained thermoplastic polymer composition tends to be lowered, when it is more than 310° C., in the case of dynamically vulcanizing a rubber (b) in the presence of the fluororesin (A) and crosslinking agent (C) under a melting condition, a melting temperature is regarded to be higher than the melting point of the fluororesin (A), however, the rubber (b) tends to be thermally deteriorated in this case.

The fluororesin (A) is not particularly limited, but may be a polymer containing at least one kind of fluorine-containing ethylenic polymer (a). As an ethylenically unsaturated compound composing a fluorine-containing ethylenic polymer (a), examples are tetrafluoroethylene, perfluoroolefin such as perfluoro ethylenically unsaturated compound represented by the general formula (1):

$$CF_2=CF-R_f^1 \quad (1)$$

(wherein $R_f^1$ represents $-CF_3$ and/or $-OR_f^2$, and $R_f^2$ represents a perfluoroalkyl group having 1 to 5 carbon atoms), chlorotrifluoroethylene, trifluoroethylene, hexafluoroisobutene, vinylidene fluoride, vinyl fluoride, ethylene chloride trifluoride, and fluoroolefin such as one represented by the general formula (2):

$$CH_2=CX^1(CF_2)_nX^2 \quad (2)$$

(wherein $X^1$ represents hydrogen atom or fluorine atom, $X^2$ represents hydrogen atom, fluorine atom, or chlorine atom, and n represents an integer of 1 to 10).

Also, as an ethylenically unsaturated compound composing fluorine-containing ethylenic polymer (a), non-fluorine-containing ethylenically unsaturated compounds other than the above-described fluoroolefin and perfluoroolefin can be listed. Examples of the non-fluorine-containing ethylenically unsaturated compound are ethylene, propylene, or alkyl vinyl ethers. Herein, the alkyl vinyl ether indicates an alkyl vinyl ether having an alkyl group with 1 to 5 carbon atoms.

Among them, from the viewpoints that heat resistance and oil resistance of the obtained thermoplastic polymer composition are excellent, and a molding process is easy, a fluorine-containing ethylenic polymer (a) comprising tetrafluoroethylene and ethylene is preferable, a fluorine-containing ethylenic polymer (a) comprising 20 to 80% by mole of a tetrafluoroethylene unit and 80 to 20% by mole of an ethylene unit is more preferable. Also, the fluorine-containing ethylenic polymer (a) comprising tetrafluoroethylene and ethylene may contain the third component, an example of the third component is 2,3,3,4,4,5,5-heptafluoro-1-pentene ($CH_2=CFCF_2CF_2CF_2H$).

An amount of the third component is preferably 0.1 to 3% by mole based on the fluorine-containing ethylenic polymer (a).

Also, from the viewpoints that heat resistance, oil resistance and flame retardancy of the obtained thermoplastic polymer composition are excellent, and a molding process id easy, a fluorine-containing ethylenic polymer (a) comprising tetrafluoroethylene and a perfluoro ethylenically unsaturated compound represented by the general formula (1):

$$CF_2=CF-R_f^1 \quad (1)$$

(wherein $R_f^1$ represents $-CF_3$ and/or $-OR_f^2$, and $R_f^2$ represents a perfluoroalkyl group having 1 to 5 carbon atoms).

Specifically, examples are combinations such as tetrafluoroethylene/hexafluoropropylene; tetrafluoroethylene/$CF_2=CF-OR_f^2$, and tetrafluoropropylene/hexafluoropropylene/$CF_2=CF-OR_f^2$. As $CF_2=CF-OR_f^2$, an example is perfluoro (alkyl vinyl ether) such as perfluoro (methyl vinyl ether), perfluoro (ethyl vinyl ether) and perfluoro (propyl vinyl ether).

Also, the fluorine-containing ethylenic polymer (a) comprising tetrafluoroethylene and a perfluoro ethylenically unsaturated compound represented by the general formula (1) may contain the third component.

From the viewpoint that a molding process of the thermoplastic polymer composition is easy, particularly in the case of such a copolymer of tetrafluoroethylene and a perfluoro ethylenically unsaturated compound represented by the general formula (1), its melting point is preferably 120 to 245° C., and the melting temperature can be set by a copolymerization ratio of tetrafluoroethylene to the perfluoro ethylenically unsaturated compound represented by the general formula (1).

Also, from the viewpoints that heat resistance and oil resistance of the thermoplastic polymer composition are excellent, and a molding process is easy, a fluorine-containing ethylenic polymer (a) comprising tetrafluoroethylene, ethylene and a perfluoro ethylenically unsaturated compound represented by the general formula (1):

$$CF_2=CF-R_f^1 \quad (1)$$

(wherein $R_f^1$ represents $-CF_3$ and/or $-OR_f^2$, and $R_f^2$ represents a perfluoroalkyl group having 1 to 5 carbon atoms). A fluorine-containing ethylenic polymer (a) comprising 19 to 90% by mole of a tetrafluoroethylene unit, 9 to 80% by mole of an ethylene unit, and 1 to 72% by mole of a perfluoro ethylenically unsaturated compound unit represented by the general formula (1) is more preferable, and 20 to 70% by mole of a tetrafluoroethylene unit, 20 to 60% by mole of an ethylene unit, and 1 to 60% by mole of a perfluoro ethylenically unsaturated compound unit represented by the general formula (1) is further more preferable.

As the fluorine-containing ethylenic polymer (a) comprising tetrafluoroethylene, ethylene and a perfluoro ethylenically unsaturated compound represented by the general formula (1) may contain an additional component, and an example of the additional component can be 2,3,3,4,4,5,5-heptafluoro-1-pentene ($CH_2=CFCF_2CF_2CF_2H$).

An amount of the additional component is preferably 0.1 to 3% by mole based on the fluorine-containing ethylenic polymer (a).

Further, from the viewpoints that heat resistance and oil resistance of the obtained thermoplastic polymer composition are excellent, and a molding process is easy, the fluorine-containing ethylenic polymer (a) is preferably vinylidene polyfluoride.

A non-fluorine-containing cured rubber (B) is at least one kind of rubber (b) which is at least partially crosslinked, and does not contain a fluorine atom in the cured rubber. Also, a non-fluorine-containing non-silicone rubber is preferable. Herein, the non-fluorine-containing non-silicone rubber is at least one kind of rubber (b) which is at least partially crosslinked, and does not contain a silicone bone structure comprising a fluorine atom, a silicon atom and an oxygen atom in a cured rubber.

The rubber (b) is not particularly limited but, for example, it is preferably at least one kind of rubber selected from the group consisting of an olefin rubber, an acrylic rubber, a nitrile rubber, a silicone rubber, an urethane rubber and an epichlorohydrin rubber from the viewpoints that heat resistance and oil resistance of the obtained thermoplastic polymer composition are excellent.

Examples of an olefin rubber are diene rubber, butyl rubber, and ethylene rubber.

Examples of the diene rubber are natural rubber, isoprene rubber, butadiene rubber, chloroprene rubber, styrene-diene rubbers such as a styrene-butadiene rubber and a styrene-diene-styrene copolymer. Herein, the styrene-diene rubbers include hydrogenated articles thereof or acid modified articles thereof.

Examples of the butyl rubber are butyl rubber, and halogenated butyl rubbers such as a chlorinated butyl rubber or a brominated butyl rubber.

Examples of the ethylene rubber are an ethylene-propylene rubber (EPM), an ethylene-propylene-diene rubber (EPDM), chlorinated polyethylene and chlorosulfonated polyethylene.

Examples of the acrylic rubber are acrylic rubber and ethylene acrylic rubber, examples of the nitrile rubber are an acrylonitrile-butadine rubber and a hyrogenated acrylonitrile-butadine rubber, examples of the silicone rubber are a dimetylsilicone rubber, a vinylmethylsilicone rubber, a phenylmethylsilicone rubber, a phenylvinylmethylsilicone rubber and a fluorosilicone rubber, and examples of the urethane rubber are a polyester urethane rubber and a polyether urethane rubber.

Among these, from the viewpoints that heat resistance and oil resistance of the obtained thermoplastic polymer composition are excellent, it is preferable that rubber (b) is at least one selected from the group consisting of an ethylene-propylene-diene rubber, an ethylene-propylene rubber, a butyl rubber, a halogenated butyl rubber, an acrylonitrile-butadiene rubber, a hydrogenated acrylonitrile-butadiene rubber, a dimethylsilicone rubber, a vinylmethylsilicone rubber and a styrene-butadiene-styrene block copolymer.

A cured rubber (B) is required to be at least partially crosslinked.

An amount of the rubber (b) is preferably 10 to 1,000 parts by weight based on 100 parts by weight of the fluororesin (A), more preferably 50 to 900 parts by weight, and further more preferably 100 to 800 parts by weight.

When an amount of the rubber (b) is less than 10 parts by weight, the obtained thermoplastic polymer composition tends to lower in flexibility, when it exceeds 1,000 parts by weight, the obtained thermoplastic polymer composition tends to lower in processability.

The thermoplastic polymer composition of the present invention can be obtained by a production process in which a preliminarily-crosslinked non-fluorine-containing rubber (B) is compounded with fluororesin (A) by a means such as melt-kneading or a preparation process in which the rubber (b) is dynamically vulcanized in the presence of fluororesin (A) and a crosslinking agent (C) under melting conditions.

Herein, being dynamically vulcanized means that the rubber (b) is dynamically vulcanized at the same time of melt-kneading by using a Banbury mixer, a pressure kneader, an extruder etc. Among them, extruders such as a twin-screw extruder are preferable from the viewpoint of applying high shearing force. By treating with dynamic vulcanization, there can be controlled the phase structure of the fluororesin (A) and the cured rubber (B), and dispersion of the cured rubber.

A crosslinking agent (C) is preferably at least one selected from the group consisting of organic peroxide, an amine compound, a hydroxyl compound, a phenol resin compound, a sulfur compound, a bismaleimide compound, and a quinoid compound.

Examples of the organic peroxide are dialkyl peroxide such as 2,5-dimethyl-2,5-bis(t-butylperoxy)hexyne-3, 2,5-dimethyl-2,5-bis(t-butylperoxy)hexane, dicumyl peroxide; and hydroperoxide such as diisopropylbenzene hydroperoxide and cumene hydroperoxide.

Also, examples of the amine compound are 6-aminohexylcarbamic acid ($H_2N-CO_2(CH_2)_6NH_2$), 1,4-butanediamine and 1,4-diaminocyclohexane.

Also, according to the necessity, together with the crosslinking agent (C), a crosslinking aid may be used.

The crosslinking agent (C) can be suitably selected according to the kind of a rubber (b) to be crosslinked and melt-kneading conditions.

Further, the rubber (b) preferably has at least one crosslinkable functional groups in a molecule, and in this case, as the crosslinking agent (C), it is preferable to use at least bifunctional compound capable of reacting with the crosslinkable functional group.

As the crosslinkable functional group that rubber (b) can contain, examples are a hydroxyl group, an epoxy group, an amino group, a carboxyl group, an anhydrous carboxyl group, a chlorine, and bromine.

Further, as the crosslinking agent (C), for example, when a crosslinkable functional group that rubber (b) can contain is an anhydrous carboxyl group, an amine compound can be used, and when a crosslinkable functional group that rubber (b) can contain is a hydroxyl group, an isocyanate compound or a compound containing an anhydrous carboxyl group can be used.

An amount of the crosslinking agent (C) is preferably 0.1 to 10 parts by weight based on 100 parts by weight of the rubber (b), and more preferably 0.2 to 8 parts by weight. When the amount of crosslinking agent (C) is less than 0.1 parts by weight, crosslinking of the rubber (b) cannot be sufficiently proceeded, the obtained thermoplastic polymer composition tends to lower in heat resistance and oil resistance, while it exceeds 10 parts by weight, the obtained thermoplastic polymer composition tends to lower in processability.

The melting conditions means a temperature at which the fluororesin (A) and the rubber (b) melt. The melting temperature is different depending on a glass transition temperature and/or a melting point of the fluororesin (A) or the rubber (b) respectively, it is preferably 120 to 330° C., more preferably 130 to 320° C. When the temperature is less than 120° C., dispersion between the fluororesin (A) and the rubber (b) tends to become coarse, and when more than 330° C., the rubber (b) tends to be thermally deteriorated.

The obtained thermoplastic polymer composition may have a structure wherein the fluororesin (A) forms a continuous phase and the cured rubber (B) forms a dispersion phase, or a structure wherein the fluororesin (A) and the cured rubber (B) form a mutually-continuous phase, among them, it is preferable that the composition has a structure wherein the fluororesin (A) forms a continuous phase and the cured rubber (B) forms a dispersion phase.

The rubber (b) that has formed a matrix in an initial stage of dispersion, along with proceeding a crosslinking reaction, the rubber (b) becomes the cured rubber (B) to increase melt viscosity, so that the cured rubber (B) becomes a dispersion phase, or it forms a mutually-continuous phase with the fluororesin (A).

Once such structure is formed, the thermoplastic polymer composition of the present invention exhibits excellent heat resistance and oil resistance, and also has satisfactory processability. On the occasion, an average dispersion particle diameter of the cured rubber (B) is preferably 0.01 to 20 μm, and more preferably 0.1 to 10 μm.

Also, the thermoplastic polymer composition of the present invention may contain a mutually-continuous phase of the fluororesin (A) and the cured rubber (B) in the part of the structure wherein the fluororesin (A) forms a continuous phase and the cured rubber (B) forms a dispersion phase, which is its preferable embodiment.

Also, when a thermoplastic polymer composition of the present invention further contains a flame retardant, excellent flame retardancy is shown. In this case, the flame retardant is not particularly limited, and commonly used flame retardants can be arbitrarily employed. For example, metal hydroxides such as magnesium oxide and aluminum hydroxide; phosphoric acid flame retardant; halogen flame retardant such as a bromine flame retardant and a chlorine flame retardant, but metal hydroxide and phosphoric acid flame retardant are preferable. Additionally, a flame retardant aid such as antimony trioxide and zinc borate, and a fuming preventing agent such as molybdenum oxide may be used together.

An amount of the above flame retardant is preferably 1 to 100 parts by weight based on totally 100 parts by weight of the fluororesin (A) and the non-fluorine-containing cured rubber (B). When the amount is less than 1 part by weight, a flame retardant effect by addition of a flame retardant is not apparently observed, and when it is more than 100 parts by weight, processability and flexibility tend to become inferior.

The amount of the above flame retardant aid is preferably 1 to 70 parts by weight based on totally 100 parts by weight of the fluororesin (A) and the non-fluorine-containing cured rubber (B), and more preferably 5 to 50 parts by weight. When it is less than 1 part by weight, the flame retardant effect by addition of a flame retardant aid is not apparently observed, and when it is more than 70 parts by weight, processability and flexibility tend to become inferior.

Also, to the thermoplastic polymer composition of the present invention, the following additives such as other polymers such as polyethylene, polypropylene, polyamide, polyester and polyurethane; inorganic fillers such as calcium carbonate, talc, clay, titanium oxide, carbon black and barium sulfate; a pigment, a lubricant, a photostabilizer, a weather resistance stabilizer, an antistatic agent, an ultraviolet absorber, an antioxidant, a mold-release agent, a foaming agent, a perfume, an oil and a softener can be added within a range where the effect of the present invention is not affected.

The thermoplastic polymer composition of the present invention can be processed by using general molding processes and molding process equipments. As a molding process, arbitrary processes, for example, injection molding, extrusion molding, compression molding, blow molding, calendar forming and vacuum molding can be adopted, and the thermoplastic polymer composition of the present invention can be formed into a molded article having an arbitrary shape according to intended uses.

Further, the present invention includes sheets or films, molded articles of an electric wire jacket obtained by using the thermoplastic polymer composition of the present invention, and also a laminate, which has layers comprising the thermoplastic polymer composition of the present invention and other materials.

The above electric wire jacket, generally in a wire and cable for electronic equipments such as a computer, is a tube in which a copper wire and its coating material are disposed to impart flame retardancy and prevent mechanical damage. The molding process thereof is not particularly limited, and examples are known processes such as extrusion molding by a cross head and a single-screw extruder.

Since the electric jacket comprises the above-described composition, it has favorable processability and flexibility, particularly excellent heat resistance, and can be favorably used as a jacket for LCC (Limited Combustible Cable) in which higher flame resistance is required than usual. The electric wire jacket of the present invention can be set to have a suitable thickness according to the application, the thickness is generally in the range of 0.2 to 1.0 mm. The electric wire jacket of the present invention has a thickness within the above range, so that it is particularly excellent in flexibility.

The electric wire jacket of the present invention is formed by using the thermoplastic polymer composition of the present invention, and is excellent in flame retardancy and flexibility.

The electric wire jacket of the present invention is not particularly limited but, for example, it can be used in an electric wire for wiring of electronic equipments, a 600 V-insulating electric wire for electric equipments and a telecommunication cable such as a LAN cable. The above-described LAN cable means a cable used for LAN.

A cable used for LAN characterized by being equipped with the electric wire jacket of the present invention is also one of the present invention. As the cable used for LAN, an examples is a plenum cable, and the above-described LCC is favorable for the cable.

A cable used for LAN of the present invention can be set to have a suitable thickness, the thickness is generally formed in 0.2 to 1.0 mm. A cable used for LAN of the present invention is equipped with the electric wire jacket of the present invention, thus, is excellent in flame retardancy and flexibility.

The thermoplastic polymer composition of the prevent invention and a molded article, sheet and film comprising the composition can be used for automobile parts, mechanical parts, electric and electronic parts, OA parts, dairy products, building materials and miscellaneous goods, and a laminate can be used for food containers, fuel containers, tubes, hoses and the like.

EXAMPLES

The present invention is explained in detail based on Examples in the following, but the invention is not to be limited only thereto.

<Hardness>

Pellets of thermoplastic polymer compositions produced in Examples or Comparative Examples were compression-molded by a heat pressing machine under the conditions of 250° C. and 10 MPa to prepare a sheet test piece having 2 mm thickness, which was measured for hardness A according to JIS-K6301.

<Tensile Strength at Break and Tensile Elongation at Break>

Pellets of thermoplastic polymer compositions produced in Examples or Comparative Examples were compression-molded by a heat pressing machine under the conditions of 250° C. and 10 MPa to prepare a sheet test piece having 2 mm thickness, therefrom a dumbbell test piece having 2 mm thickness and 5 mm width was punched out. The obtained dumbbell test piece was measured for tensile strength at break and tensile elongation at break at 23° C., and tensile strength at break at 140° C. by using an autograph (manufactured by Shimadzu Corporation) according to JIS-K6301 at 50 mm/min.

<Compression Permanent Deformation>

A molded article of a right circular cylinder having a diameter of 29.0 mm and a thickness of 12.7 mm was prepared from pellets of thermoplastic polymer compositions produced in Examples or Comparative Examples by an injection molding machine at a cylinder temperature of 250° C., according to JIS-K6301, the compression permanent deformation was measured after the article was left stood under the conditions of a temperature at 120° C. and 25% of compression deformation-amount for 22 hours.

<Chemical Resistance>

Pellets of thermoplastic polymer compositions produced in Examples or Comparative Examples were compression-molded by a a heat pressing machine under the conditions of 250° C. and 10 MPa to produce a sheet test piece having 2 mm thickness, therefrom a dumbbell test piece having 2 mm thickness and 5 mm width was punched out. The obtained dumbbell test piece was immersed in JIS NO. 3 oil, left stood at 100° C. for 70 hours. Then, the dumbbell test piece was taken out, tensile strength at break at 23° C. was measured by using an autograph (manufactured by Shimadzu Corporation) according to JIS-K6301 under the conditions of 50 mm/min, and the change ratio of the measurement to the tensile strength at break before immersion was calculated.

<Flame Retardancy>

Pellets of thermoplastic polymer compositions produced in Examples or Comparative Examples were compression-molded by a heat pressing machine under the conditions of 250° C. and 10 MPa to produce a sheet test piece having 2 mm thickness, therefrom a sheet test piece having 2 mm thickness and 50 mm length and 50 mm width was punched out. A burning test was carried out on the obtained sheet test piece by using a cone calorimeter (manufactured by Toyo Seiki Seisaku-sho, Ltd.) to obtain a heat rate and a smoking rate.

In Examples and Comparative Examples, the following fluorine-containing ethylenic polymer (a-1), fluorine-containing ethylenic polymer (a-2), rubber (b-1), rubber (b-2), rubber (b-3), rubber (b-4), crosslinking agent (C-1), crosslinking agent (C-2), flame retardant (D) and flame retardant aid (E) were used.

<Fluorine-Containing Ethylenic Polymer (a-1)>

Tetrafluoroethylene-ethylene copolymer (melting point of 220° C.: Neoflon ETFE EP-620 available from Daikin Industries, Ltd.)

<Fluorine-Containing Ethylenic Polymer (a-2)>

Tetrafluoroethylene-hexafluoropropylene copolymer (weight ratio of tetrafluoroethylene/hexafluoropropylene=75/25; melting point of 192° C.)

<Rubber (b-1)>

Maleic anhydride-modified product of a hydrogenated styrene-butadiene-styrene block copolymer (Toughtec M1943 available from Asahi Kasei Corporation)

<Rubber (b-2)>

Ethylene-propylene rubber (EP57P, available from JSR Corporation)

<Rubber (b-3)>

Crosslinked silicone rubber powder (E-600 available from Dow Corning Toray Co. Ltd.)

<Rubber (b-4)>

Unvulcanized silicone rubber (SH851U available from Dow Corning Toray Co. Ltd.)

<Crosslinking Agent (C-1)>

6-aminohexylcarbamic acid (V-1 available from Daikin Industries, Ltd.)

<Crosslinking Agent (C-2)>

2,5-dimethyl-2, 5-bis(t-butylperoxy)hexyne-3 (Perhexyne 25B available from NOF Corporation)

<Flame Retardant (D)>

Bromine flame retardant (FIRE GUARD 7500 available from TEIJIN CHEMICALS LTD.)

<Flame Retardant Auxiliary (E)>

Antimony trioxide (PATOX-M available from NIHON SEIKO Co., Ltd.)

Examples 1 to 3

The above-described fluorine-containing ethylenic polymer (a-1), rubber (b-1) and crosslinking agent (C-1) were pre-mixed in the ratio shown in Table 1, thereafter the mixture was supplied to a twin-screw extruder to be melt-kneaded at 260° C. of cylinder temperature and at 100 rpm of a screw rotation number, and pellets of thermoplastic polymer compositions were respectively prepared.

Examples 4 to 6

The above-described fluorine-containing ethylenic polymer (a-1), rubber (b-2) and crosslinking agent (C-2) were pre-mixed in the ratio shown in Table 1, thereafter, the mixture was supplied to a twin-screw extruder to be melt-kneaded at 260° C. of cylinder temperature and at 100 rpm of a screw rotation number, and pellets of thermoplastic polymer compositions were respectively prepared.

From morphology observation of the thermoplastic polymer compositions obtained in Examples 1 to 6 by a scanning electron microscope (manufactured by JEOL Ltd.), it was found that the composition had a structure wherein the fluororesin (A) forms a continuous phase and the cured rubber (B) forms a dispersion phase.

Measurements of hardness, tensile strength at break, tensile elongation at break and compression permanent strain and evaluations of chemical resistance were conducted by using the pellets of the thermoplastic polymer composition obtained according to the above methods. The results were shown in Table 1.

Comparative Example 1

Pellets of a thermoplastic polymer composition were produced in the same manner as in Example 3 except that the crosslinking agent (C-1) was not compounded.

Comparative Example 2

Pellets of a thermoplastic polymer composition were produced in the same manner as in Example 6 except that the crosslinking agent (C-2) was not compounded.

From morphology observation of the thermoplastic polymer composition obtained in Comparative Example 1 or 2 by a scanning electron microscope (manufactured by JEOL Ltd.), it was found that the composition had a structure wherein the rubber (b) forms a continuous phase and the fluororesin (A) forms a dispersion phase.

Measurements of hardness, tensile strength at break, tensile elongation at break and compression permanent strain, and evaluations of chemical resistance were conducted by using the pellets of the thermoplastic polymer composition obtained according to the above methods. The results were shown in Table 1.

Comparative Example 3

30 parts by weight of polypropylene (J106W available from Grand Polymer Co. Ltd.), 70 parts by weight of ethylene-propylene-diene rubber (EPDM EP21 available from JSR Corporation.) and 0.5 parts by weight of a crosslinking agent (Parkmil D available from NOF Corporation) were pre-mixed, thereafter, the mixture was melt-kneaded by a Plastmil melt-kneading equipment under the conditions at 230° C. and at 50 rpm for 10 minutes to synthesize a dynamically-vulcanized rubber (TPV-1) comprising polypropylene and crosslinked EPDM.

From a morphology observation of the obtained thermoplastic polymer composition by a scanning electron microscope (manufactured by JEOL Ltd.), it was found that the composition had a structure wherein propylene forms a continuous phase and crosslinked ethylene-propylene-diene rubber forms a dispersion phase.

The measurements of hardness, tensile strength at break, tensile elongation at break and compression permanent deformation, and the evaluations of chemical resistance were conducted by using the pellets of only the obtained dynamically-vulcanized rubber (TPV-1) according to the above methods. The results were shown in Table 1.

Comparative Examples 4 and 5

The above-described fluorine-containing ethylenic polymer (a-2), rubber (b-4) and flame retardant (D) and flame retardant aid (E) were pre-mixed without compounding a crosslinking agent in the ratio shown in Table 2, thereafter, the mixture was supplied to a twin-screw extruder to be melt-kneaded at 250° C. of a cylinder temperature and at 100 rpm of a screw rotation number, and pellets of thermoplastic polymer compositions were prepared.

From morphology observation of the thermoplastic polymer composition obtained in Comparative Examples 4 and 5 by a scanning electron microscope (manufactured by JEOL Ltd.), it was found that the composition had a structure wherein the fluororesin (A) forms a continuous phase and the uncured rubber (b-4) forms a dispersion phase.

The evaluations of tensile strength at break, tensile elongation at break, and flame retardancy were conducted by using the pellets of the thermoplastic polymer compositions obtained according to the above methods. The results were shown in Table 2.

TABLE 1

|  | Ex. | | | | | | Com. Ex. | | |
| --- | --- | --- | --- | --- | --- | --- | --- | --- | --- |
|  | 1 | 2 | 3 | 4 | 5 | 6 | 1 | 2 | 3 |
| Amounts (part by weight) | | | | | | | | | |
| Fluorine-containing ethylenic polymer (a) | 50 | 40 | 30 | 50 | 40 | 30 | 30 | 30 |  |
| Rubber (b-1) | 50 | 60 | 70 |  |  |  | 70 |  |  |
| Rubber (b-2) |  |  |  | 50 | 60 | 70 |  | 70 |  |
| Crosslinking agent (C-1) | 0.12 | 0.15 | 0.20 |  |  |  |  |  |  |
| Crosslinking agent (C-2) |  |  |  | 0.10 | 0.12 | 0.14 |  |  |  |
| Dynamically-vulcanized rubber (TPV-1) |  |  |  |  |  |  |  |  | 100 |
| Evaluation results | | | | | | | | | |
| Hardness | 99 | 92 | 84 | 90 | 85 | 78 | 79 | 73 | 78 |
| Tensile strength at break (MPa) at 23° C. | 19 | 15 | 12 | 20 | 14 | 12 | 7 | 9 | 10 |
| Tensile elongation at break (%) at 23° C. | 93 | 125 | 140 | 102 | 137 | 156 | 255 | 234 | 155 |
| Tensile strength at break (MPa) at 140° C. | 12 | 10 | 8 | 13 | 10 | 8 | 0 | 6 | 3 |
| Compression permanent strain (%) | 67 | 54 | 45 | 53 | 46 | 37 | 100 | 40 | 48 |
| Chemical resistance (%) | 68 | 51 | 38 | 73 | 60 | 47 | 0 | 29 | 3 |

Examples 7 to 10

The above-described fluorine-containing ethylenic polymer (a-2), rubber (b-3) and flame retardant (D) and flame retardant aid (E) were pre-mixed in the ratio shown in Table 2, thereafter, the mixture was supplied to a twin-screw extruder to be melt-kneaded at 250° C. of a cylinder temperature and at 100 rpm of a screw rotation number, and pellets of thermoplastic polymer compositions were prepared.

From morphology observation of the thermoplastic polymer compositions obtained in Examples 7 to 9 by a scanning electron microscope (manufactured by JEOL Ltd.), it was found that the composition had a structure wherein the fluororesin (A) forms a continuous phase and the cured rubber (B) forms a dispersion phase.

The evaluations of tensile strength at break, tensile elongation at break and flame retardancy were conducted by using the pellets of the thermoplastic polymer compositions obtained according to the above methods. The results were shown in Table 2.

TABLE 2

|  | Ex. | | | | Com. Ex. | |
| --- | --- | --- | --- | --- | --- | --- |
|  | 7 | 8 | 9 | 10 | 4 | 5 |
| Amounts (part by weight) | | | | | | |
| Fluorine-containing ethylenic polymer (a-2) | 90 | 80 | 90 | 80 | 90 |  |
| Rubber (b-3) | 10 | 20 | 10 | 20 |  |  |
| Rubber (b-4) |  |  |  |  | 10 | 20 |
| Flame retardant (D) |  |  | 10 | 10 | 10 | 10 |
| Flame retardant aid (E) |  |  | 5 | 5 | 5 | 5 |
| Evaluation results | | | | | | |
| Tensile strength at break (MPa) at 23° C. | 21 | 15 | 19 | 14 | 12 | 10 |
| Tensile elongation at break (%) at 23° C. | 312 | 256 | 286 | 238 | 112 | 101 |
| Heat rate (kW/m) | — | — | 37 | 48 | 46 | 53 |
| Smoking rate (1/sec) | — | — | 3.1 | 3.8 | 3.7 | 4.2 |

INDUSTRIAL APPLICABILITY

In the thermoplastic polymer composition of the present invention, cured rubber particles are dispersed in a fluorine-containing ethylenic polymer, therefore the thermoplastic polymer composition has both excellent heat resistance and chemical resistance, and also has flexibility and excellent processability.

The invention claimed is:

1. A thermoplastic polymer composition, comprising a fluororesin (A) and non-fluorine-containing cured rubber (B), wherein the fluororesin (A) comprises a fluorine-containing ethylenic polymer (a), and the non-fluorine-containing cured rubber (B) is at least one rubber (b) which is at least partially crosslinked.

2. The thermoplastic polymer composition of claim 1, wherein the fluorine-containing ethylenic polymer (a) has a melting point of 120 to 310° C.

3. The thermoplastic polymer composition of claim 1, wherein the rubber (b) is at least one rubber selected from the group consisting of an olefin rubber, an acrylic rubber, a nitrile rubber, a silicone rubber, an urethane rubber and an epichlorohydrin rubber.

4. The thermoplastic polymer composition of claim 1, wherein the cured rubber (B) is a rubber, in which the rubber (b) is dynamically-vulcanized in the presence of the fluororesin (A) and a crosslinking agent (C).

5. The thermoplastic polymer composition of claim 1, wherein the fluororesin (A) forms a continuous phase and the cured rubber (B) forms a dispersion phase in the structure of the composition.

6. The thermoplastic polymer composition of claim 1, wherein the fluororesin (A) is a copolymer of tetrafluoroethylene and ethylene.

7. The thermoplastic polymer composition of claim 1, wherein the fluororesin (A) is a copolymer of tetrafluoroethylene and a perfluoro ethylenically unsaturated compound represented by the following general formula (1):

$$CF_2=CF-R_f^1 \quad (1)$$

(wherein $R_f^1$ represents $-CF_3$ or $-OR_f^2$, and $R_f^2$ represents a perfluoroalkyl group having 1 to 5 carbon atoms).

8. The thermoplastic polymer composition of claim 1, wherein the fluororesin (A) is a polymer comprising 19 to 90% by mole of a tetrafluoroethylene unit, 9 to 80% by mole of an ethylene unit, and 1 to 72% by mole of a perfluoro ethylenically unsaturated compound unit represented by the following general formula (1):

$$CF_2=CF-R_f^1 \quad (1)$$

(wherein $R_f^1$ represents $-CF_3$ or $-OR_f^2$, and $R_f^2$ represents a perfluoroalkyl group having 1 to 5 carbon atoms).

9. The thermoplastic polymer composition of claim 1, wherein the fluororesin (A) is polyvinylidene fluoride.

10. The thermoplastic polymer composition of claim 1, wherein the rubber (b) is at least one selected from the group consisting of an ethylene-propylene-diene rubber, an ethylene-propylene rubber, a butyl rubber, a halogenated butyl rubber, an acrylonitrile-butadiene rubber, a hydrogenated acrylonitrile-butadiene rubber, a dimethylsilicone rubber, a vinylmethylsilicone rubber and a styrene-diene-styrene block copolymer.

11. The thermoplastic polymer composition of claim 4, wherein the crosslinking agent (C) is at least one selected from the group consisting of organic peroxide, an amine compound, a hydroxy compound, a phenol resin compound, a sulfur compound, a bismaleimide compound and a quinoid compound.

12. The thermoplastic polymer composition of claim 4, wherein the rubber (b) has at least one crosslinkable functional group in a molecule, and the crosslinking agent (C) is a compound having two or more functional groups and being capable of reacting with said functional group.

13. The thermoplastic polymer composition of claim 1, further comprising a flame retardant.

14. A molded article, comprising the thermoplastic polymer composition of claim 1.

15. A sheet, comprising the thermoplastic polymer composition of claim 1.

16. A film, comprising the thermoplastic polymer composition of claim 1.

17. A laminate, which has layers comprising the thermoplastic polymer composition of claim 1.

* * * * *